(12) United States Patent
Gurjar

(10) Patent No.: US 11,769,380 B2
(45) Date of Patent: Sep. 26, 2023

(54) EVENT INDICATIONS OF HAZARDOUS ENVIRONMENT LUMINAIRES USING VISUAL SEQUENCES

(71) Applicant: APPLETON GRP LLC, Rosemont, IL (US)

(72) Inventor: Ravindra Viraj Gurjar, Pune (IN)

(73) Assignee: APPLETON GRP LLC, Rosemont, IL (US)

( * ) Notice: Subject to any disclaimer, the term of this patent is extended or adjusted under 35 U.S.C. 154(b) by 0 days.

(21) Appl. No.: 17/734,726

(22) Filed: May 2, 2022

(65) Prior Publication Data
US 2022/0254233 A1 Aug. 11, 2022

Related U.S. Application Data

(63) Continuation of application No. 16/738,898, filed on Jan. 9, 2020, now Pat. No. 11,328,564.

(30) Foreign Application Priority Data

Aug. 31, 2019 (IN) .............................. 201921035199

(51) Int. Cl.
*G08B 5/38* (2006.01)
*G08B 21/02* (2006.01)
(52) U.S. Cl.
CPC ............... *G08B 5/38* (2013.01); *G08B 21/02* (2013.01)
(58) Field of Classification Search
CPC .......... G08B 5/38; G08B 21/02; G05B 15/02; H05B 47/105; H05B 47/11; H05B 47/115;
(Continued)

(56) References Cited

U.S. PATENT DOCUMENTS 7,221,104 B2 5/2007 Lys et al.
7,546,168 B2 6/2009 Walters et al.
(Continued)

FOREIGN PATENT DOCUMENTS

CN 102434785 A 5/2012
CN 106030673 A 10/2016
(Continued)

OTHER PUBLICATIONS

Office Action and Search Report for Chinese Patent Application No. 2020800757087, dated Dec. 2, 2022.
(Continued)

*Primary Examiner* — Orlando Bousono
(74) *Attorney, Agent, or Firm* — MARSHALL, GERSTEIN & BORUN LLP

(57) ABSTRACT

A luminaire whose primary operation is to provide ambient or focused lighting in a hazardous environment is further configured to communicate, within the hazardous environment, alert and/or detected events or conditions via visual sequences. Different visual sequences uniquely identify respective alerts and/or detected conditions, which may include conditions occurring at the luminaire and/or conditions occurring within the hazardous environment. Different visual sequences are defined by respective blink sequences stored in a blink sequence library at the luminaire. Blink sequences are configurable, are distinguished by different amplitudes, frequencies, duty cycles, and other energization/de-energization waveform characteristics, and are applied to one or more illumination sources of the luminaire to thereby generate corresponding visual sequences in the hazardous environment. Visual sequences generated by hazardous environment luminaires allow personnel within the hazardous environment to be informed or alerted to critical con-
(Continued)

ditions upon their occurrences, even without the use of a portable computing device.

20 Claims, 4 Drawing Sheets

(58) Field of Classification Search
CPC .... H05B 47/175; H05B 47/19; H05B 47/195; Y02B 20/40
See application file for complete search history.

(56) References Cited

U.S. PATENT DOCUMENTS

| | | |
|---|---|---|
| 8,942,564 B2 | 1/2015 | Jovicic et al. |
| 9,119,169 B2 | 8/2015 | Luo et al. |
| 9,143,230 B2 | 9/2015 | Casaccia et al. |
| 9,191,107 B2 | 11/2015 | Manahan |
| 9,473,248 B2 | 10/2016 | Yang et al. |
| 9,520,939 B2 | 12/2016 | Jovicic et al. |
| 9,660,727 B2 | 5/2017 | Jovicic et al. |
| 9,735,868 B2 | 8/2017 | Jovicic et al. |
| 9,813,150 B1 | 11/2017 | Bitra et al. |
| 9,843,386 B2 | 12/2017 | Baggen et al. |
| 9,848,468 B1 | 12/2017 | Mikani |
| 9,857,162 B1 | 1/2018 | Gum et al. |
| 9,871,585 B2 | 1/2018 | Rietman et al. |
| 9,973,275 B2 | 5/2018 | Nyarko et al. |
| 10,006,592 B2 | 6/2018 | Carney et al. |
| 10,009,100 B2 | 6/2018 | Jovicic et al. |
| 10,020,881 B2 | 7/2018 | Jovicic |
| 10,027,409 B2 | 7/2018 | Rietman et al. |
| 10,040,007 B2 | 8/2018 | Adam |
| 10,128,948 B2 | 11/2018 | Jovicic |
| 10,190,761 B1 | 1/2019 | Winters et al. |
| 10,194,513 B2 | 1/2019 | Jayawardena et al. |
| 10,210,447 B2 | 2/2019 | Jayawardena et al. |
| 10,260,722 B2 | 4/2019 | Treible, Jr. et al. |
| 11,328,564 B2 | 5/2022 | Gurjar |
| 2007/0285921 A1 | 12/2007 | Zulim et al. |
| 2012/0235579 A1* | 9/2012 | Chemel ............... F21V 29/60 |
| | | 315/152 |
| 2014/0055619 A1 | 2/2014 | Holland et al. |
| 2014/0270101 A1 | 9/2014 | Maxwell et al. |
| 2016/0091217 A1 | 3/2016 | Verberkt et al. |
| 2016/0234899 A1 | 8/2016 | Reed et al. |
| 2016/0286627 A1* | 9/2016 | Chen ................... H05B 47/175 |
| 2016/0286629 A1* | 9/2016 | Chen ..................... H05B 47/19 |
| 2017/0019970 A1* | 1/2017 | Chemel ................. H05B 47/19 |
| 2017/0180045 A1* | 6/2017 | Breuer ................. H04B 10/116 |
| 2017/0180046 A1* | 6/2017 | Stout ....................... G01C 21/20 |
| 2017/0301220 A1 | 10/2017 | Jarrell et al. |
| 2018/0375576 A1* | 12/2018 | Stout ....................... G08B 7/066 |
| 2019/0098725 A1* | 3/2019 | Sadwick ................. F21S 2/00 |
| 2019/0132055 A1 | 5/2019 | Deixler et al. |
| 2019/0154245 A1 | 5/2019 | Winters et al. |
| 2019/0159322 A1 | 5/2019 | Jayawardena et al. |
| 2019/0199958 A1 | 6/2019 | Abe et al. |
| 2019/0200433 A1 | 6/2019 | Jayawardena et al. |
| 2019/0208598 A1 | 7/2019 | Davis et al. |
| 2019/0215934 A1* | 7/2019 | Chen ....................... F21V 13/04 |
| 2019/0234603 A1 | 8/2019 | Treible, Jr. et al. |
| 2020/0170093 A1* | 5/2020 | Mirsky ................... F21S 8/085 |

FOREIGN PATENT DOCUMENTS

| | | |
|---|---|---|
| CN | 106815987 A | 6/2017 |
| CN | 109686023 A | 4/2019 |
| CN | 109937325 A | 6/2019 |
| CN | 110023678 A | 7/2019 |
| JP | 2006-278048 A | 10/2006 |
| WO | WO-2010/063001 A1 | 6/2010 |
| WO | WO-2017/003931 A1 | 1/2017 |
| WO | WO-2019/115599 A1 | 6/2019 |

OTHER PUBLICATIONS

First Examination Report for India Application No. 201921035199, dated May 11, 2021.
International Search Report and Written Opinion for Application No. PCT/US2020/046594, dated Oct. 27, 2020.

* cited by examiner

EVENT INDICATIONS OF HAZARDOUS ENVIRONMENT LUMINAIRES USING VISUAL SEQUENCES

CROSS REFERENCE TO RELATED APPLICATIONS

This application is a continuation of U.S. application Ser. No. 16/738,898, which was filed on Jan. 9, 2020 and entitled "Event Indications of Hazardous Environment Luminaires Using Visual Sequences," which claims priority to Indian Patent Application No. 201921035199, which was filed on Aug. 31, 2019 and entitled "Event Indications of Hazardous Environment Luminaires Using Visual Sequences," both of which are hereby incorporated by reference herein in their entireties.

FIELD OF THE DISCLOSURE

This disclosure relates to luminaires, lighting units, and light fixtures that are disposed in hazardous environments, such as intrinsically safe and/or explosion proof luminaires, lighting units, and light fixtures that provide ambient, task, and/or focused light within hazardous environments.

BACKGROUND

The background description provided within this document is for the purpose of generally presenting the context of the disclosure. Work of the presently named inventors, to the extent described in this background section, as well as aspects of the description that may not otherwise qualify as prior art at the time of filing, are neither expressly nor impliedly admitted as prior art against the present disclosure.

Intrinsically safe and/or explosion proof luminaires, lighting units, and light fixtures provide general, ambient light and/or task or focused light within hazardous environments such as industrial process plants, manufacturing facilities, oil refineries, power-generating systems, mines, and the like. As such, intrinsically safe and/or explosion proof luminaires, lighting units, and light fixtures must comply with all standards and/or regulatory rules that are applicable to the particular hazardous environment in which they are disposed, e.g., to prevent ignition and/or explosion of hazardous atmospheric mixtures such as flammable gases and/or dust, to protect electronics within the luminaire from being compromised or damaged, to contain any explosion that may occur, etc. Such luminaires may be rated by Class, Division, and Group. For example, a Class 1, Division 1, Group D, E, and F is a commonly required rating for products that are located in hazardous environments within the petrochemical industry, in which flammable vapors may be present. Generally speaking, intrinsically safe and/or explosion proof luminaires, lighting units, and light fixtures are designed to limit undesirable and/or dangerous effects of thermal and/or electrical energy generated during both their normal use and maintenance, as well as during fault conditions. For ease of reading, intrinsically safe and/or explosion proof luminaires, lighting units, and/or light fixtures that are located in hazardous environments are generically referred to herein as "hazardous environment (HE) luminaires, lighting units, and/or light fixtures", and/or simply as "luminaires, lighting units, and/or light fixtures."

Known hazardous environment luminaires, lighting units, and light fixtures, though, typically are not able to autonomously and independently communicate detected critical events or alerts in real-time (or in near real-time) to a user who is located within the hazardous environment without requiring and/or utilizing significant resources.

For example, some luminaires utilize a wireless communication interface to communicate detected events to portable computing devices operated by users who are located proximate to or within the environment of the luminaires. In some arrangements, a luminaire sends wireless transmissions that include alert and/or event information directly to a user's portable computing device via some wireless communication protocol such as Bluetooth or other short-range protocol, Wi-Fi, WirelessHART, or other wireless communication protocol. In other arrangements, the luminaire sends, via a wireless communication network, wireless transmissions that include alert and/or event information to a host computer or back-end system for processing and forwarding to the user's portable computing device via the wireless communication network. Known wired techniques for communicating alert and/or event information from a luminaire include requiring the user to physically connect a physical cable or line between a port of the user's portable computing device and a port of the luminaire to thereby provide a channel for communicating alert/event information, or requiring the luminaire to send alert/event information via wired transmissions over a wired communication network to a host computer or back-end system (e.g., by using a wired communication protocol such as HART, Ethernet, or other wired communication protocol), and subsequently having the host computer/back-end system forward or otherwise communicate the content of the received alert/event in wireless manner to the portable computing device operated by the user (e.g., via Wi-Fi, WirelessHART, etc. over a wireless communication network).

However, some of these alerting communication techniques, such as those that require a user's portable computing device to utilize Bluetooth or Wi-Fi, are not compliant with hazardous environment standards and regulations, and therefore may not be utilized within hazardous environments. Other wireless alert communication techniques that rely on wireless communication networks are not able to communicate critical alerts and events to user's portable computing device when the wireless network is not operational or is compromised (e.g., due to interference, faults, etc.), when the user's portable computing device is not within wireless range of a wireless access point, and/or when the user's portable computing device is itself compromised. Further, after a luminaire has been installed at roof height or at some other substantial height, and/or when access to an installed luminaire is obstructed by process plant or other physical equipment, it may be extremely difficult or even impossible for a user to gain access to a port of the luminaire to be able to physically plug in a wired communication cable or line for the reception of alerts, let alone to do so in a timely manner after the occurrence of a fault or event. Still further, requiring wired and/or wireless networks to be purchased, installed, configured, and maintained in order for an alert signal to be sent and received by users located within the hazardous environment of the luminaires not only incurs significant capital and person-hour expense, but also utilizes significant bandwidth, processor, and other limited computing and/or communication resources of the installed communication system(s).

Another known technique that enables portable computing devices operated by users located within hazardous environments to receive alert and event information utilizes Visual Light Communication (VLC), a technology in which visible spectrum is modulated to transmit data at high frequencies, e.g., 780-375 nanometers or tens of KHz. VLC techniques, though, require VLC-capable transceivers to be installed at the user's portable computing device so that the user's device is able to decode VLC signals, thus adding additional weight, complexity, and cost to the user's device, as well as consuming a significant portion of the limited processing, memory, and power resources of the user's device. Further, in arrangements in which the luminaire self-reports alerts using VLC transmissions, such VLC-capable transceivers must also be installed and maintained at the luminaire itself. Still further, VLC techniques are not effective when line-of-sight between a luminaire and a user's portable computing device is obstructed, e.g., by plant equipment, environmental particles, and the like.

SUMMARY

The systems, methods, and techniques disclosed herein relate to a hazardous environment (HE) luminaire, lighting unit, or light fixture disposed in a hazardous environment. During its normal run-time operations, embodiments of the disclosed HE luminaire, lighting unit, or light fixture radiates general or ambient light and/or task or focused light into the hazardous environment. Advantageously, the disclosed HE luminaire, lighting unit, or light fixture is also configured to autonomously and independently communicate various alert and/or event information to a user (e.g., a person) who is located within the hazardous environment. In fact, the HE luminaire, lighting unit, or light fixture may communicate various alert and/or event information to the user within the hazardous environment in real-time (e.g., upon detection of the occurrence of an event and/or upon detection of a condition that corresponds to an alert) without the HE luminaire, lighting unit, or light fixture being required to be connected to any communication network, without requiring a portable computing device operated by user to be configured with specialized transceivers, without requiring the user's portable computing device to be positioned within the wireless range of the luminaire or of a wireless access point, and without requiring the user's portable computing device to be positioned in line-of-sight of the disclosed luminaire, lighting unit, or light fixture. Indeed, a user located within the hazardous environment does not even need a portable computing device at all for the user to receive alert and/or event information from the disclosed HE luminaire, lighting unit, or light fixture.

In particular, embodiments of the disclosed hazardous environment (HE) luminaire, lighting unit, or light fixture may indicate each specific alert or occurrence of a specific event or condition by generating a respective visual sequence that uniquely identifies the alert or event/condition. The term "visual sequence," as utilized herein, generally refers to an ordered sequence of illuminations that are visible to or perceivable by the human eye, and that may be generated by the HE luminaire by varying the energizations and de-energizations of its on-board illumination source or sources. Each visual sequence or ordered sequence of illuminations uniquely identifies an occurrence of a respective event or condition, or a respective alert. A visual sequence may be continuously repeated over time in a pattern, if desired. The HE lighting unit may generate (e.g., radiate) different visual sequences by energizing and de-energizing (e.g., by energizing and not energizing, by activating and deactivating) one or more on-board illumination sources according to different blink sequences. Each blink sequence may define a respective combination of frequencies, amplitudes, duty cycles, intensities, and/or other characteristics of energizations/de-energizations of the one or more illumination sources of the HE luminaire, and different blink sequences may be differentiated or distinguished based on their respective combinations of frequencies, amplitudes, duty cycles, intensities, and/or other characteristics of energizations/de-energizations.

In an embodiment, a luminaire disposed in a hazardous environment includes one or more drivers coupled to one or more illumination sources, one or more processors coupled to the one or more drivers, and one or more memories storing a set of computer-executable instructions. The set of computer-executable instructions, when executed by the one or more processors, cause the luminaire to detect an occurrence, within the hazardous environment, of a particular event included in a plurality of events; determine a particular blink sequence identifying the event, the particular blink sequence included in a plurality of blink sequences; and cause the one or more drivers to energize the one or more illumination sources in accordance with the particular blink sequence, thereby causing the luminaire to generate an visual sequence indicative of the occurrence of the particular event. Additionally, the luminaire includes one or more hazardous location enclosures in which the one or more illumination sources, the one or more drivers, the one or more processors, and the one or more memories are disposed.

In an embodiment, a luminaire disposed in a hazardous environment includes a blink sequence library stored in one or more memories and defining a plurality of blink sequences, where each blink sequence identifies a respective event of a plurality of events. The luminaire additionally includes an alerting unit, where the alerting unit includes a set of computer-executable instructions stored on the one or more memories. When the set of computer-executable instructions of the alerting unit are executed by one or more processors, the alerting unit causes the luminaire to: detect an occurrence, within the hazardous environment, of a particular event included in a plurality of events; access the blink sequence library to determine a particular blink sequence identifying the particular event; and instruct one or more drivers to energize one or more illumination sources included in the luminaire in accordance with the particular blink sequence, thereby causing the luminaire to generate a visual sequence indicative of the occurrence of the particular event. The luminaire additionally includes one or more hazardous location enclosures that surround or enclose the one or more memories, the one or more processors, the one or more drivers, and the one or more illumination sources.

DETAILED DESCRIPTION

Figure 1:
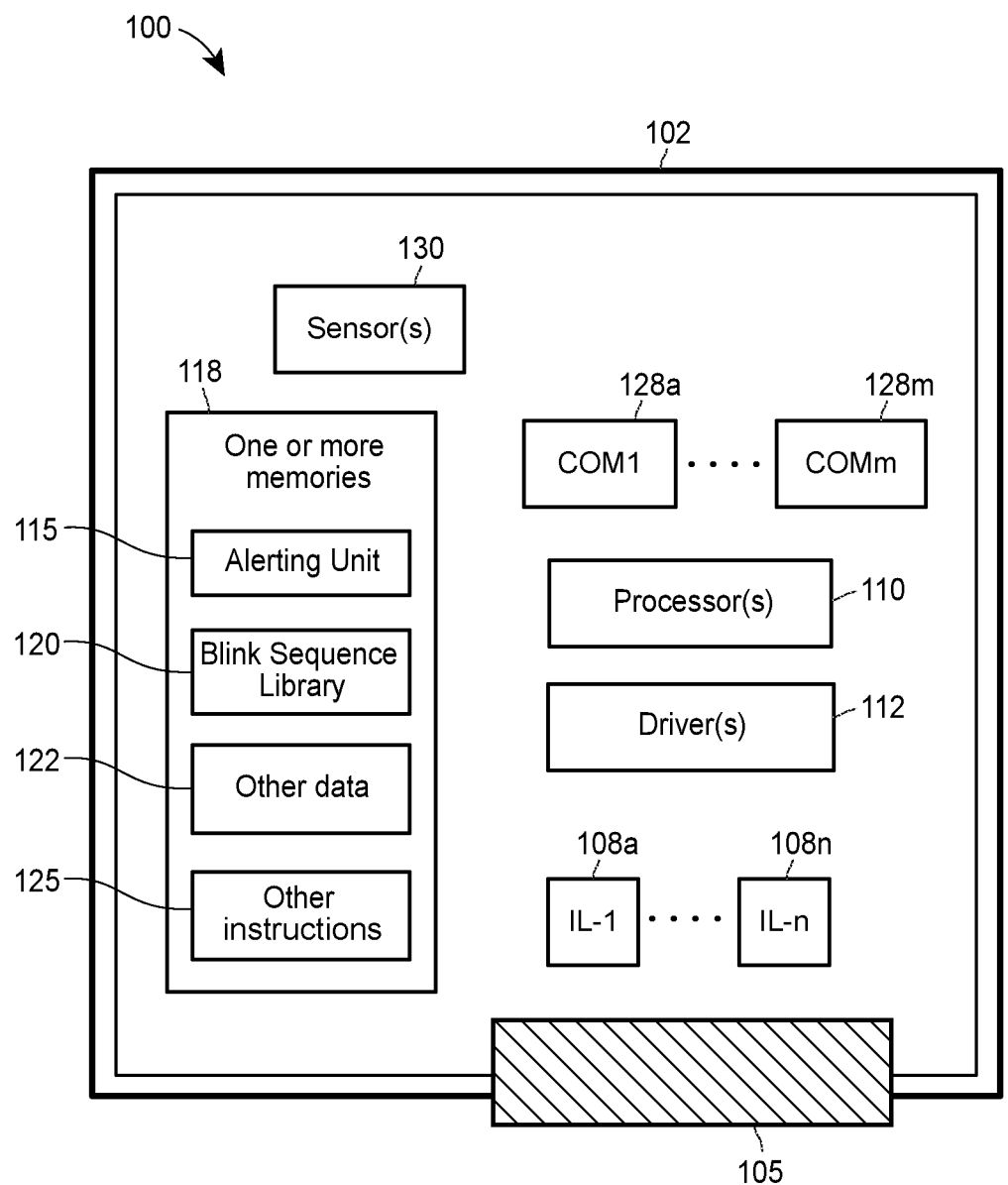
FIG. 1 is a block diagram of an example hazardous environment lighting unit, light fixture, or luminaire that communicates alert and/or event indications using visual sequences.

FIG. 1 is a block diagram of an example hazardous environment lighting unit, light lighting unit, light fixture, or luminaire 100 that provides alert and/or event indications, within a hazardous environment, using visual sequences. The terms "lighting unit", "light fixture", and "luminaire" are utilized interchangeably herein to refer to an electrically powered group of components that operates to supply general or ambient light and/or task or focused light in the portion of the electromagnetic spectrum that is visible to the human eye, e.g., from about 380 to 740 nanometers. The luminaire 100 is disposed within a hazardous environment 100, such as an industrial process plant, a manufacturing facility, an oil refinery, a power-generating system, a mine, etc. As such, the luminaire 100 is a hazardous environment (HE) luminaire that is compliant with any (and in some cases, all) standards and/or regulations governing its configuration, installation, and usage within the hazardous environment. That is, the luminaire 100 complies with standard and/or regulated thermal and electrical limits so as to limit the energy generated by the luminaire 100 that is available for potential ignition and/or explosion within the hazardous environment. Further, the HE luminaire 100 includes at least one hazardous location enclosure or housing 102 in which its components are typically disposed or enclosed. For example, the hazardous location enclosure or housing 102 may be explosion-proof, flame-proof, water-proof, sealed, hermetically sealed, dust ignition protected, etc. In some embodiments of the luminaire 100 (not shown in FIG. 1), a single luminaire 100 may include multiple hazardous location enclosures or housings 102, each of which surrounds a different subset of components of the luminaire 100; however, for ease of reading herein (and not for limitation purposes) the hazardous location enclosure or housing 102 is referred to using the singular tense. Moreover, at least one portion 105 of the hazardous location enclosure or housing 102 is at least partly transparent or visible light-permeable, so that illumination or light generated by one or more illumination sources IL-1 to IL-n (corresponding to references 108a-108n in FIG. 1) of the luminaire 100 is able to radiate into the hazardous environment. The illumination sources 108a-108n may be any suitable type of illumination source that generates visible light, e.g., incandescent, halogen, fluorescent, metal halide, xenon, LEDs (light emitting diodes), etc.

In FIG. 1, the luminaire 100 includes one or more processors 110, one or more drivers 112 (e.g., drivers for illuminations sources), and one or more illumination sources 108a-108n that are enclosed in, surrounded by, and/or otherwise protected by the hazardous location enclosure 102. Generally speaking, the one or more processors 110 instruct the one or more drivers 112 to energize or activate the one or more illumination sources 108a-108n, e.g., individually or independently, and/or as a set or group in a coordinated manner. For example, the one or more processors 110 may instruct the one or more drivers 112 to energize or activate the one or more illumination sources 108a-108n based on or in accordance with instructions and/or information provided by an alerting unit 115 of the luminaire 100. The alerting unit 115 may include a set of computer-executable instructions that are executable by the one or more processors 110 and that are stored on the one or more memories 118 of the luminaire 100, where the one or more memories 118 are, for example, one or more tangible, non-transitory memories, components, or data storage devices. The one or more memories 118 may also store a blink sequence library 120 that defines relationships between each event or condition of a plurality of events/conditions and a respective blink sequence that uniquely identifies the each event or condition. In some arrangements, the one or more memories 118 may also store other data 122 that is accessible to the one or more processors 110 and/or other computer-executable instructions 125 that are executable by the one or more processors 110 to cause luminaire 100 perform other operations in addition to providing alert and/or event indications using blink or visual sequences. For example, the other computer-executable instructions 125 may be executable by the one or more processors 110 to cause the luminaire 100 to perform its run-time lighting operations, to communicate with other luminaires and/or with a back-end server (e.g., wirelessly) to coordinate lighting functions across a group of luminaires, to execute diagnostic and/or maintenance operations, etc.

Generally speaking, the alerting unit 115 may cause the luminaire 100 to detect an occurrence, within the hazardous environment, of a particular event included in a plurality of events. The alerting unit 115 may access the blink sequence library 120 to determine a particular blink sequence that is defined to identify the particular event, and may instruct the one or more drivers 112 to energize/de-energize the one or more illumination sources 118a-118n in accordance with the particular blink sequence to thereby cause the luminaire 100 to generate or radiate the corresponding visual sequence of illuminations. The visual sequence of illuminations generated by the luminaire 100 thereby alerts users or personnel, who are located within the hazardous environment and who are able to perceive the visual sequence, of the occurrence of the detected event or condition.

In some embodiments, the plurality of events whose occurrences are detectable by the luminaire 100 include diagnostic and/or maintenance operation statuses and/or results. For example, while the luminaire 100 is undergoing a particular diagnostic operation or a particular maintenance operation (e.g., is autonomously self-executing the particular diagnostic or maintenance operation), various blink sequences may identify the different stages of the diagnostic and/or maintenance operation execution. Other blink sequences may identify different results of completed diagnostic and/or maintenance operations.

In some embodiments, the plurality of events whose occurrences are detectable by the luminaire 100 include faults, errors, and/or alert conditions related to the luminaire 100, its components, and/or its run-time operations. For example, the alerting unit 115 may receive a signal from another component of the luminaire 100 indicating the occurrence of a fault, error, or other alert condition, and the alerting unit 115 may determine the corresponding blink sequence from the blink sequence library 120 for generating the particular visual sequence that is indicative of the occurrence of the fault, error, or other alert condition. Examples of possible faults, errors, or other alert conditions corresponding to components and/or run-time operations of the luminaire 100 which may be indicated by visual sequences include a low back-up battery level, a software fault, a hardware or electronics fault, an expected lifetime of a particular illumination source falling below a predefined level, an overheating and/or failure of some component, an unexpected message received via a communication port of the luminaire 100, and/or other faults, errors, and/or alert conditions.

In some embodiments, the luminaire 100 is communicatively connected to one or more networks via one or more communication interfaces 128a-128m. For example, the luminaire 100 may be communicatively connected to a wireless network via a first communication interface (COM1) 128a and/or may be communicatively connected to a wired network via a second communication interface (COMm) 128m. As such, the luminaire 100 may be a node of a wireless network and/or may be a node of a wired network. Each of the wireless and/or wired networks may include one or more other nodes such as, for example, a back-end computer, controller, or server that is disposed in a non-hazardous environment or otherwise is shielded from the harsh conditions of the hazardous environment. Other examples of nodes which may be included in the wireless and/or wired network may include, in some configurations, one or more other luminaires, sensors, and other devices disposed within the hazardous environment. At any rate, in embodiments in which the luminaire 100 is a node of a wireless network and/or of a wired network, different blink sequences may be defined to indicate different detected conditions that affect the communicative connectivity of the luminaire 100 to other nodes via the one or more networks. For example, different blink sequences may correspond to the luminaire 100 being unable to detect the presence of an expected wireless network at the COM1 interface 128a, and/or the presence of interference within the wireless network above a pre-determined level. Different blink sequences may correspond to the luminaire 100 being unable to communicate with a controller, backend server, a wireless gateway, another luminaire, or some other node even though the luminaire 100 has an active and operational network connection via the wireless COM1 interface 128a and/or via the wired COM2 interface 128m. Different blink sequences may correspond to the luminaire 100 detecting that it has been dropped from the wireless network or from the wired network. Of course, other blink sequences corresponding to other connectivity conditions may be additionally or alternatively defined in the blink sequence library 120.

In some embodiments, the plurality of events whose occurrences are detectable by the luminaire 100 include sensed events or detected conditions. For example, the luminaire 100 may include one or more on-board sensors 130 and/or may be communicatively connected to one or more off-board sensors (e.g., sensors that are not enclosed within the hazardous location housing 102 but are nonetheless communicatively connected to the luminaire 100 via one or more of the communication interfaces 128a-128m, not shown in FIG. 1), such as motion sensors, light sensors, cameras, vibration sensors, temperature sensors, particulate sensors, pressure sensors, heat sensors, etc. Each sensor may respectively detect an occurrence of a specific type of event or condition, and may transmit a signal indicative of the occurrence of the specific type of event or condition to the alerting unit 115.

For some sensed events, the alerting unit 115 may automatically indicate an occurrence each time the alerting unit 115 is notified by the sensor. For other sensed events, the alerting unit 115 may determine whether an occurrence of a sensed event is an expected event or is an unexpected event. For example, when a motion sensor 128 of the luminaire 100 detects a movement in a certain area of the hazardous environment, the motion sensor 128 may transmit an electronic signal indicative of the detected movement to the alerting unit 115, and the alerting unit 115 may determine whether or not the movement is an expected movement. For example, if plant personnel are not expected to be located within the certain area the hazardous environment at the time that the movement is detected by the sensor 128, the alerting unit 115 may determine that the movement is an unexpected movement, and thus is an occurrence of a particular event that is to be indicated by the luminaire 100.

At any rate, upon detecting the occurrence of an event or condition within the hazardous environment, the alerting unit 115 accesses the blink sequence library 120 to determine the specific blink sequence that is indicative of the occurrence of the detected event/condition. Subsequently, the alerting unit 115 instructs, via the one or more processors 110, the one or more drivers 112 to energize/de-energize (e.g., activate/deactivate) the one or more of the illumination sources 108a-108n in accordance with the specific blink sequence, thereby causing the luminaire 100 to generate the specific visual sequence that is indicative of the occurrence of the detected event/condition. As the illumination sources 108a-108n of the luminaire 100 radiate visible light through the at least partially transparent portion 105 of the hazardous location enclosure 102, any users, people, or personnel who are at locations within the hazardous environment at which they are able to see or perceive the visual sequence generated by the illumination sources 108a-108n are thereby informed by the luminaire 100 of the occurrence of the detected event/condition.

Turning to the blink sequence library 120 in particular, as previously mentioned, the blink sequence library 120 stores definitions or indications of a plurality of blink sequences, each of which uniquely identifies a respective alert or an occurrence of a respective event or condition of a plurality of events or conditions, at least some of which are directly detectable by the luminaire 100. Different blink sequences may be distinguished from other blink sequences by different combinations of cycle frequencies, duty cycles, amplitudes and/or intensities (e.g., different levels of high (HI)/low (LO), and/or other characteristics.

Figure 2A:
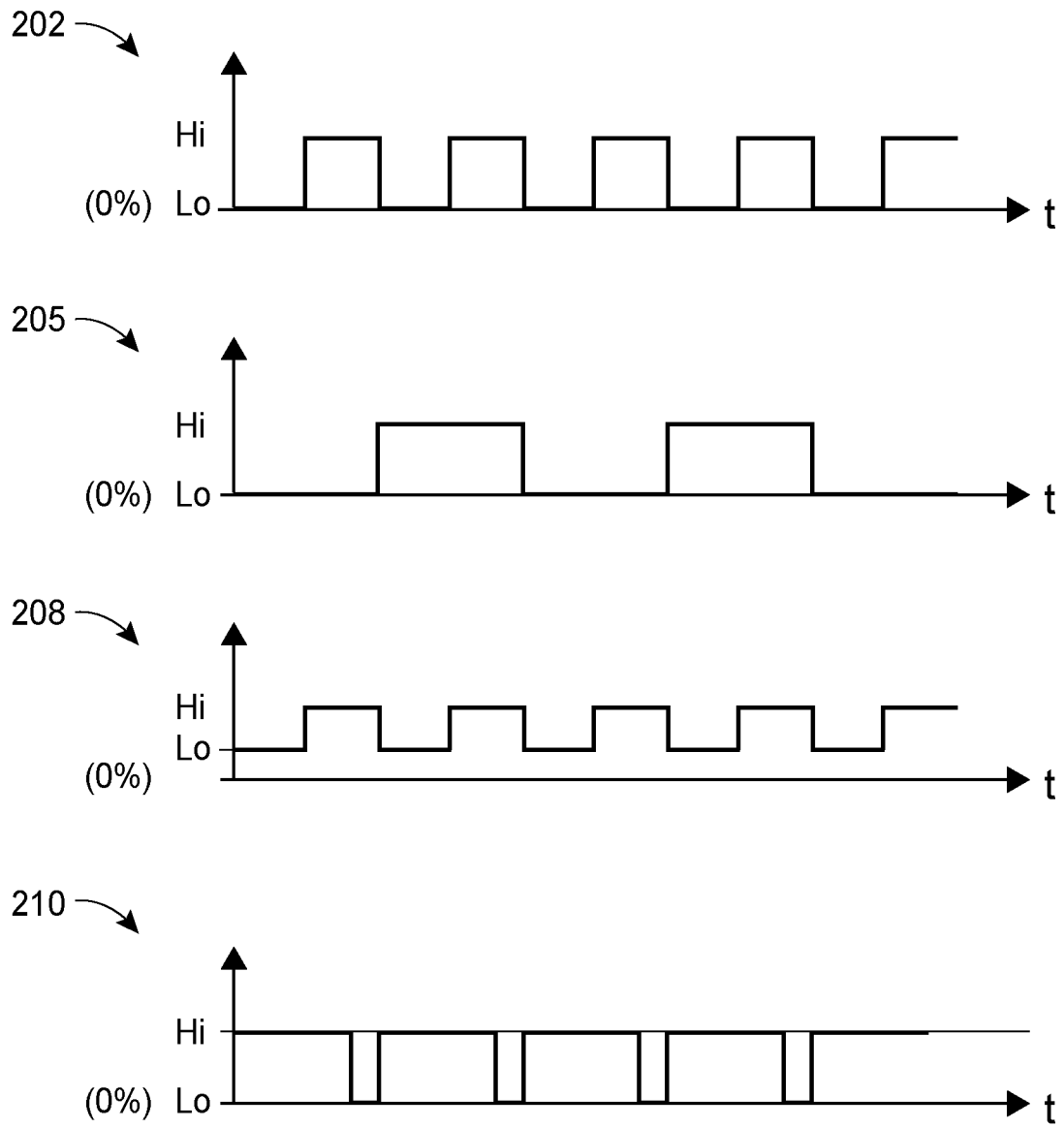
FIG. 2A illustrates example blink sequences which may be applied to a single illumination source of a hazardous environment luminaire, or which may be simultaneously applied to a group of illumination sources of a hazardous environment luminaire that behave as a single, integral illumination source to generate respective visual sequences.

FIG. 2A illustrates example blink sequences 202-210 which may be stored in the blink sequence library 120 and applied to a single illumination source, such as one of the illumination sources 108a-108n of FIG. 1. For example, the alerting unit 115 may instruct one of the drivers 112 to energize and de-energize one of the illumination sources 118a in accordance with one of the example blink sequences 202-210, thereby causing the luminaire 100 to generate a corresponding visual sequence.

In blink sequence 202, the amplitude of the energizations varies between 0% (LO) and 100% (HI) per cycle over time, and the duty cycle of the blink sequence 202 is 50%. In blink sequence 205, while the amplitude of the energizations varies between 0% (LO) and 100% (HI) and the duty cycle is 50%, the frequency of the blink sequence 205 is half of the frequency of the blink sequence 202.

In blink sequence 208, the duty cycle is maintained at 50% and the frequency is the same as the frequency of blink sequence 202. However, in blink sequence 208, the amplitude of the energizations varies between 50% (LO) and 100% (HI). That is, the range of intensities of the blink sequence 208 (e.g., from 50% to 100%) is less than a maximum range of intensities (e.g., from 0% to 100%) of the illumination source. As such, the visual sequence corresponding to the blink sequence 208 results in a blinking dimming of the illumination source rather than a blinking on/off of the illumination source. As such, the visual sequence corresponding to the blink sequence 208 may have a smoother or more damped visual effect than the visual sequence corresponding to the blink sequence 202, and thus may cause less visual discomfort and/or irritation to personnel located within the hazardous environment 300.

In blink sequence 210, the amplitude of the energizations varies between 0% (LO) and 100% (HI) (e.g., an on/off blink sequence), however, the duty cycle of the blink sequence 210 is 80%.

Of course, other blink sequences which are applicable to a single illumination source may be stored in the blink sequence library 120. In some configurations, blink sequences that are applicable to single illumination source may be simultaneously applied to a group of illumination sources, thereby causing the group of illumination sources to behave as a single, integral illumination source.

Figure 2B:
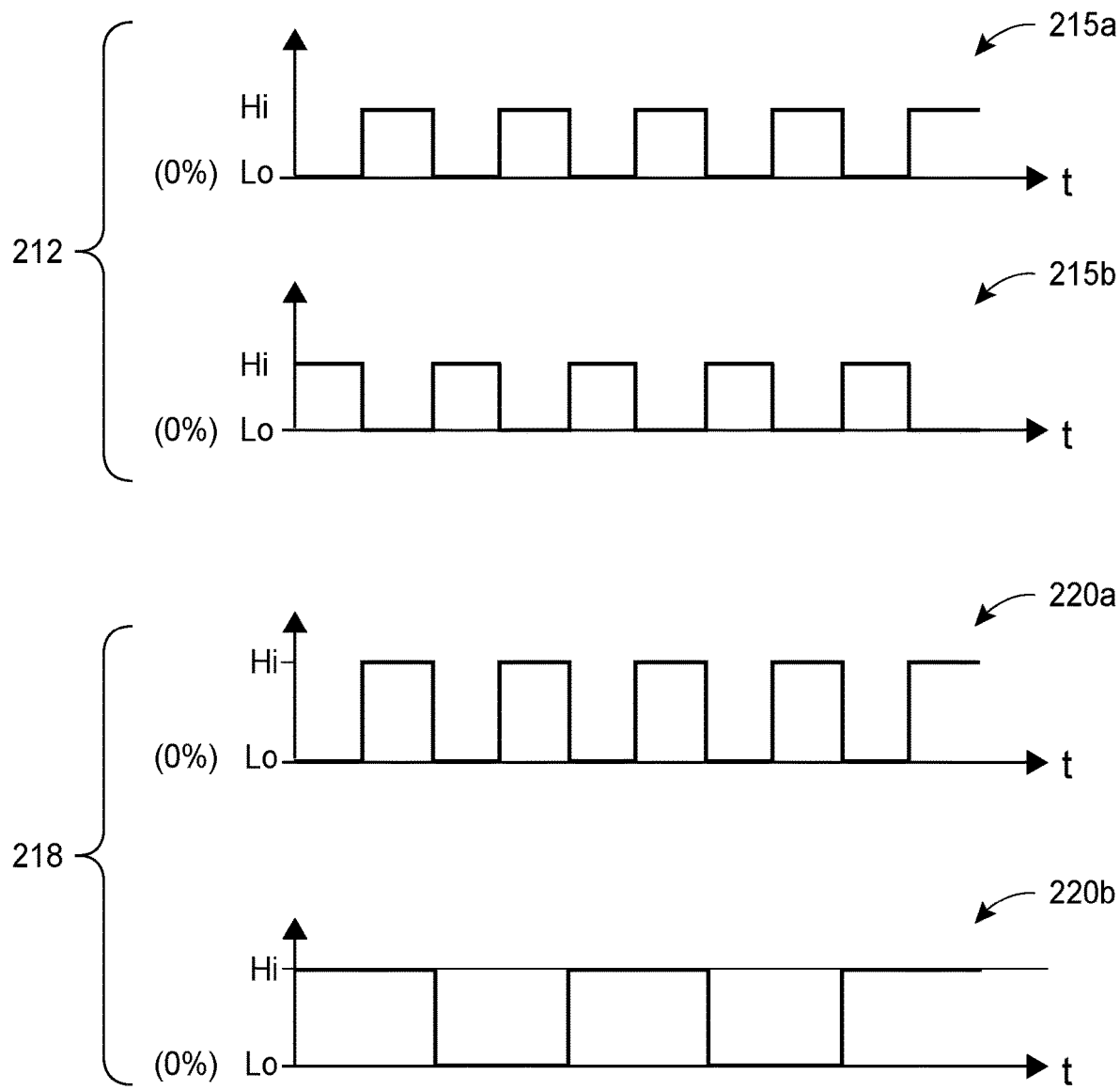
FIG. 2B illustrates example coordinated blink sequences which may be applied to multiple illumination sources of a hazardous environment luminaire that behave as distinct, different illumination sources to generate respective visual sequences.

In some implementations, the blink sequence library 120 may store blink sequences that are coordinated blink sequences. A coordinated blink sequence may include multiple individual blink sequences that execute in coordination over time, where each of the individual blink sequence is applied to a different illumination source 118a-118n. For example, a first individual blink sequence of a coordinated blink sequence may be applied to a first illumination source 118a, and a second individual blink sequence of the coordinated blink sequence may be applied to a second illumination source 118m, where the first and second blink sequences are different blink sequences that are coordinated in their executions over time. For a coordinated blink sequence, the alerting unit 115 may instruct one or more of the drivers 112 to energize and de-energize two or more of the illumination sources 118a-118n in a coordinated manner. FIG. 2B illustrates two example coordinated blink sequences 212, 218 which may be applied to two illumination sources of the luminaire 100.

In the coordinated blink sequence 212, a first individual blink sequence 215a corresponds to a first illumination source of the luminaire 100 being energized/de-energized over time (e.g., by a first driver 112) between 0% (LO) and 100% (HI) at a particular frequency, e.g., at a frequency that is perceivable by the human eye. Simultaneously, a second individual blink sequence 215b corresponds to a second illumination source of the luminaire 100 being energized/de-energized over time (e.g., by the first driver or by a second driver 112) at the same frequency as the first individual blink sequence 215a. The first individual blink sequence 215a and the second individual blink sequence 215b are coordinated over time so that peak amplitude at the second illumination source occurs at the trough amplitude of the first illumination source, and vice versa.

In the coordinated blink sequence 218, a first individual blink sequence 220a corresponds to a first illumination source of the luminaire 100 being energized/de-energized over time (e.g., by a first driver 112) between 0% (LO) and 100% (HI) at a particular frequency. Simultaneously, a second individual blink sequence 220b corresponds to a second illumination source of the luminaire 100 being energized/de-energized over time (e.g., by the first driver or by as second driver 112) at a frequency that is half of the frequency of the first individual blink sequence 220a.

Of course, other coordinated blink sequences which are applicable to two or more illumination sources in a coordinated manner over time may be stored in the blink sequence library 120 and applied to multiple illumination sources to thereby indicate respective alerts and/or detected events/conditions.

One or more of the individual and/or coordinated blink sequences that are stored in the library 120 may be defined to execute continuously and periodically over time, e.g., in a manner such as illustrated in FIGS. 2A and 2B. For some of the blink sequences that are defined to execute continuously, the range of intensities that are radiated may be reduced to be less than the maximum range of intensities of the illumination source(s), e.g., to reduce visual discomfort of personnel within the hazardous environment. However, some continuously executed blink sequences may be defined to execute across the maximum range of intensities of the illumination source(s), e.g., to identify particularly critical events and/or conditions.

In some embodiments, one or more of the individual and/or coordinated blink sequences stored in the library 120 may be defined to execute periodically, but not continuously over time. That is, a blink sequence may be executed for a first portion of a periodic time interval, and may not be executed for the remainder of the periodic time interval. For example, the luminaire 100 may execute a blink sequence during the first minute of a periodically repeating ten minute interval, and during the remaining nine minutes of the ten minute interval, the luminaire 100 may not execute the blink sequence, and may instead execute its run-time lighting operations, e.g., operations to provide ambient or focused light to the hazardous environment, diagnostic operations, maintenance operations, and/or other run-time operations.

Figure 3:
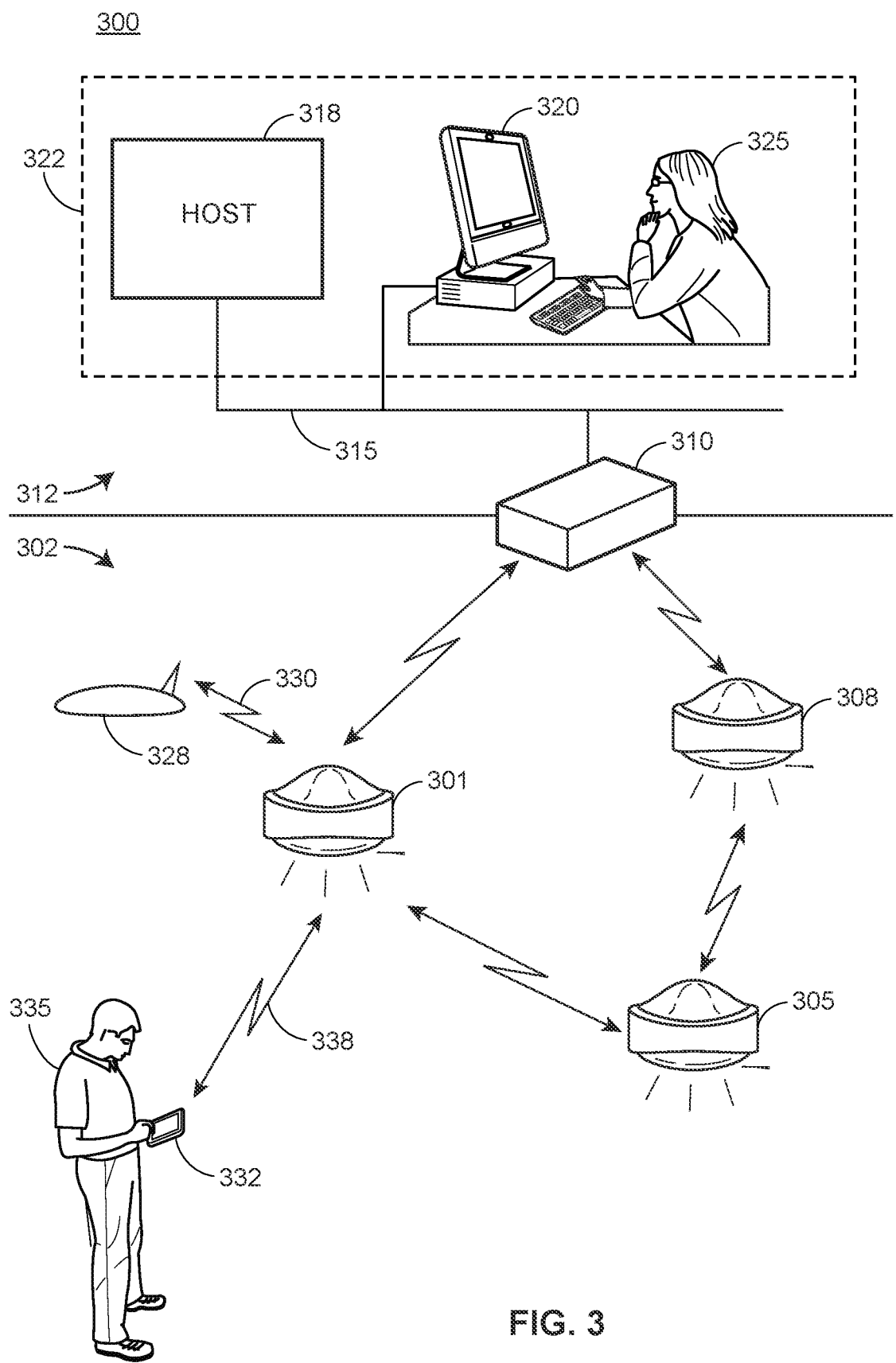
FIG. 3 depicts an example hazardous environment in which the hazardous environment lighting unit, light fixture, or luminaire of FIG. 1 may be located or disposed.

FIG. 3 depicts an example hazardous environment 300 in which a hazardous environment (HE) lighting unit, light fixture or luminaire 301 may be located. For example, the HE luminaire 301 of FIG. 3 may be an embodiment of the HE luminaire 100. For ease of discussion (and not for limitation purposes), FIG. 3 is discussed below in conjunction with reference numbers included in FIG. 1.

As illustrated in FIG. 3, the luminaire 301 is a node of a wireless network 302 of the hazardous environment 300, where the wireless network 302 includes other nodes such as other luminaires 305, 308 and a wireless gateway 310 which communicatively interconnects the wireless network 302 and a wired network 312 associated with the hazardous environment 300. The wired network 312 includes a wired backbone 315 (e.g., which may be Ethernet, broadband, fiber optic, or any suitable type of wired backbone) to which a back-end server, host, controller, computing device, and/or group of computing devices behaving as a single logical server or host 318 is communicatively connected. The host 318 may be implemented by an individual computing device, by one or more controllers and/or systems associated with the hazardous environment (such as a programmable logic controller (PLC), distributed control system (DCS), or other type of industrial process control system), by a bank of servers, by a computing cloud, or by any suitable arrangement of one or more computing devices. The host 318 may service nodes of the wired network 312 and/or nodes of the wireless network 302. For example, the host 318 may provide (e.g., via download or other mechanism) configuration and/or operating instructions 125 and/or data 122 (e.g., that correspond to governing or controlling run-time lighting, diagnostic, maintenance, and/or other operations) to one or more nodes of the network(s) 302, 312, such as one or more of the luminaires 301, 305, 308, and/or other nodes. Further, the host 318 may provide instructions and/or data that are related to generating alerting visual sequences to one or more luminaires 301, 305, 308, e.g., via download or other suitable mechanism. For example, the host 318 may provide at least a portion of the blink sequence library 120 and/or the alerting unit 115 to the HE luminaire 301.

Wired network 312 also includes a user computing device 320 which is communicatively connected via the backbone 315. The server 318 and the user computing device 320 may be disposed or located in one or more remote or enclosed locations 322 that protect the server 318 and the user computing device 320 from the harsh conditions of the hazardous environment 300. In some arrangements (not shown in FIG. 3), the protected user computing device 320 may be communicatively connected to the wired backbone 315 via a wireless link and access point, where the access point is communicatively connected in a wired manner to the backbone 315. A user 325 may utilize the computing device 320 to configure, modify, and/or otherwise provide instructions and/or data utilized by and/or stored at the host 318, and/or to view data and information provided by other devices and/or nodes via the wired network 312 and/or the wireless network 302 corresponding to the hazardous environment 300. For example, via the user computing device 320, the user 325 may add, delete, and/or modify various blink sequences of the blink sequence library 120, and/or may indicate which particular blink sequences correspond to which particular HE luminaires 301, 305, 308 within the hazardous environment 300.

The wired network 312 and the wireless network 302 may be in compliance with applicable hazardous environment standards and regulations. For example, the wireless network 302 may utilize Wi-Fi, WirelessHART, and/or one or more other communication protocols that are suitable for (e.g., is in compliance with all regulations and standards that are applicable to) the hazardous environment 300, and devices of the networks 302, 312 that are located at least partially within the hazardous environment 300 (e.g., the luminaires 301, 305, 308, the wireless gateway 310, and the backbone 315) may similarly comply with all applicable hazardous environment standards and regulations that pertain to the hazardous environment 300.

The example hazardous environment 300 depicted in FIG. 3 includes a sensor 328 which is communicatively connected to the luminaire 301 via a wireless link 330. The wireless link 330 may be included in the wireless network 302, or the wireless link 330 may be a short-range or other type of wireless link 330 that is excluded from the wireless network 302 and directly connects the sensor 328 with the luminaire 301. In some embodiments (not shown in FIG. 3), the sensor 328 may be communicatively connected to the luminaire 301 in a wired manner that is compliant with applicable hazardous environment standards and regulations. In some embodiments (not shown in FIG. 3), the sensor 328 may be included in and/or integral to the luminaire 301, such as the sensor 130 of FIG. 1. The sensor 328 may be any type of sensor such as a motion sensor, a camera or other type of light sensor, a vibration sensor, a temperature sensor, a particulate sensor, a pressure sensor, a heat sensor, etc.

As further depicted in FIG. 3, the example hazardous environment 300 includes a portable computing device 332 that is operated by a user 335 within the hazardous environment 300. The portable computing device 332 is compliant with hazardous environment standards and regulations applicable to the hazardous environment 300. For example, the portable computing device 332 may be configured to communicate with the luminaire 301 and/or with other nodes of the wireless network 302 using a WirelessHART protocol or some other protocol that is suitable for (e.g., is in compliance with all regulations and standards that are applicable to) the hazardous environment 300. The portable computing device 332 may be any type of wireless or mobile computing device, such as a laptop, tablet, smart phone, smart device, wearable computing device (e.g., virtual reality device, headset, or other body-borne device), etc. The portable computing device 332 may or may not be a node of the wireless network 302.

In some embodiments, the portable computing device 332 is a server, host, controller, computing device, and/or group of computing devices behaving as a single logical server or host that services the nodes of the wireless network 302. For example, the host 332 may provide (e.g., via download or other mechanism) configuration and/or operational instructions 125 and/or data 122 (e.g., that correspond to governing or controlling run-time lighting, diagnostic, maintenance, and/or other operations) to one or more nodes of the wireless network 302, such as to one or more of the luminaires 301, 305, 308. Further, the host 332 may provide instructions and/or data that are related to generating visual sequences to one or more HE luminaires 301, 305, 308, e.g., via download or other suitable mechanism. For example, the host 332 may provide at least a portion of the blink sequence library 120 and/or the alerting unit 115 to the HE luminaire 301. A user 335 may utilize a user interface of the host 332 to configure, modify, and/or otherwise provide instructions and/or data stored at the host 332, and/or to view data and information provided by other devices and/or nodes via the wireless network 302 corresponding to the hazardous environment 300. For example, the user 335 may add, delete, and/or modify various blink sequences of the blink sequence library 120 and/or may indicate which particular blink sequences correspond to which particular HE luminaires 301, 305, 308 via a user interface of the host 332.

Generally speaking, a user 325, 335 may utilize one or more of the user interface computing devices 320, 332 to manage a master or system version of the blink sequence library 120 that is stored at the host 318, 332 and its utilization within the hazardous environment 300. For example, as discussed above, the user 325, 335 may add, delete, and/or modify various blink sequences stored in the blink sequence library 120. In some implementations, the user 325, 335 may define which particular library blink sequences are (and/or are not) to be delivered to which particular luminaires 301, 305, 308. Additionally or alternatively, the user 325, 335 may indicate which blink sequences that have been delivered to and are resident at the luminaire 301 are to be activated and/or suppressed, e.g., so that the user 325, 335 is informed of only the occurrences of events that are of interest to the user 325, 335.

Several example scenarios which may occur in the hazardous environment 300 illustrate the advantages and benefits of embodiments of the hazardous environment luminaire 301 configured to communicate or indicate alerts and other detected events or conditions by using visual sequences. In a first example scenario, the luminaire 301 is executing a diagnostic operation or a maintenance operation, and generates respective visual sequences in accordance with various stages of the diagnostic or maintenance operation as the luminaire 301 proceeds through the stages, thereby informing the user 335 located within the hazardous environment 300 of the progress of the executing diagnostic/maintenance operation. Upon completion or abortion of the diagnostic or maintenance operation, the luminaire 301 generates a visual sequence that is indicative of a result of the completed or aborted diagnostic or maintenance operation. This first example scenario is particularly useful when the luminaire 301 is a standalone mode, and is not connected to either the wireless network 302 or to the wired network 312. In these situations, the user 335 may be easily and timely informed of diagnostic/maintenance operation statuses and results merely by visually perceiving the visual sequences, and does not even need a portable computing device 332 to do so.

In a second example scenario, the luminaire 301 detects a fault, failure, error, and/or sub-optimal performance of one of its components or run-time lighting operations. Accordingly, the luminaire 301 generates the identifying visual sequence to indicate the detected fault, failure, error, or sub-optimal performance of the component/run-time operation of the luminaire 301. This second example scenario is also particularly useful when the luminaire 301 is a stand-alone mode and not connected to either the wireless network 302 or to the wired network 312. In these situations, the user 335 may be informed of the detected fault, failure, error, and such or sub-optimal performance of the component/run-time operation at the luminaire 301 merely by visually perceiving the visual sequences, and does not even need a portable computing device 332 to do so.

In a third example scenario, the luminaire 301 is connected to a sensor 328 via a wired or wireless connection as shown in FIG. 3, or the luminaire 301 may include an on-board sensor such as the sensor 130 of FIG. 1 (not shown in FIG. 3). Upon the sensor 130, 328 detecting or sensing a condition occurring within the hazardous environment 300, the sensor 328 sends a corresponding signal to the luminaire 301, and the luminaire 301 energizes its illumination source(s) 108a-108n in a visual sequence that identifies the sensed condition. In some embodiments of this third example scenario, the luminaire 301 generates the visual sequence each time the sensor 130, 328 notifies the luminaire 301. In some embodiments of this third example scenario, the luminaire 301 generates the visual sequence only when the sensed condition is unexpected. For example, when the sensor 130, 328 is a motion sensor, motion that is detected by the sensor 328 during working hours and signaled to the luminaire 301 may merely cause the luminaire 301 to illuminate normally to provide ambient lighting (e.g., to execute its typical run-time operations), whereas motion that is detected by the sensor 328 during non-working hours may cause the luminaire 301 to generate the visual sequence indicating that the sensed motion was unexpected.

In some scenarios, the luminaire 301 not only provides alerts and/or indications of detected conditions and/or events via visual sequences, but the luminaire 301 also provides additional information relating to the alert or detected condition/event via one or more other communication channels, such as via one or more of the communication interfaces 128a-128m. For example, the luminaire 301 may generate, via one or more of its illumination sources 108a-108n, a visual sequence indicating that an unexpected motion has been detected, and may also send, via one or more communication interfaces 128a-128m, related information such as an identification of the sensor 130, 328 that detected the condition/event, a time of detection, etc., to a host 318 or 332 via the wireless network 302 and/or the wired network 312, or directly to a user's portable computing device 332 via a direct wireless link 338. Other types of useful information that corresponds to the generated visual alert may be sent by the luminaire 301 via the one or more communication interfaces 128a-128m to one or more of the hosts 318, 332. For example, to continue with the motion sensor example, the luminaire 301 may also send, to the hosts 318 and/or 332, image information captured by a camera sensor and heat information detected by a heat sensor, as well as respective identifications of the camera and the heat sensor, to thereby identify or aid in identifying a source of the motion detected by the sensor 328 (e.g., a person, an animal, a piece of equipment that disengaged, a leaf or other environmental object, etc.). In situations in which the detected condition/event is not related to sensors but is related to other devices or to on-board components and/or operations, the luminaire 301 may send other types of related information to the hosts 318, 332 via one or more of the communication interfaces 128a-128m. For example, for certain detected faults and/or error conditions detected at the luminaire 301, the luminaire 301 may send identifications of related on-board components, routines, and/or modules, as well as other information such time of occurrence, related settings, and the like.

The luminaire 301 may provide particularly useful alert indications when the luminaire 301 is a node of the wireless network 302. For example, the luminaire 301 may be one of several luminaires 301, 305, 308 that are connected via the wireless network 302. The connected luminaires 301, 305, 308, may be supported and/or controlled at least partially by a host device 318, e.g. via the wireless gateway 310 and wired backbone 315, or the connected luminaires 301, 305, 308 may be supported and/or controlled at least partially by a host device 332 that is a node of the wireless network 302. In some situations, the host device 318, 332 may issue instructions to communicate and/or coordinate run-time operations among the set of luminaires 301, 305, 308, e.g., by directly transmitting commands to each luminaire 301, 305, 308, or by relaying commands via a chain of luminaires, e.g., by the host device 318 sending a command to the luminaire 308, which relays the command to the luminaire 305, which in turn relays the command to the luminaire 301. In some connected lighting situations, a luminaire may autonomously generate a command or message and communicate it to other nodes via the wireless network 302, e.g., via the wireless gateway 310, via one or more other intermediate nodes of the wireless network 302, and/or directly (e.g., point-to-point). For example, the luminaire 301 may be connected to a motion sensor 328 via a wired or wireless connection, or a sensor 130 may be included in the luminaire 301. Upon the sensor 130, 328 detecting a motion within the hazardous environment 300, the sensor 328 communicates a corresponding signal to the processor(s) 110 of the luminaire 301, and the luminaire 301 energizes its illumination sources in response to receiving the indication of the motion detected by the sensor 130, 328. Additionally, the luminaire 301 may instruct (e.g., via the wireless network 302, the wireless gateway 310, one or more other intermediate nodes of the wireless network 302, and/or directly) one or more other luminaires 305, 308 to energize their respective illumination sources, e.g., in response to the motion detected by the sensor 130, 328.

At any rate, in these and other configurations in which the luminaire 301 is a node of the wireless network 302, the luminaire 301 may inform personnel located within the hazardous environment 300 (e.g., the user 335) of various detected status, conditions, and events related to the wireless network 302 by generating respective, identifying visual sequences. For example, the luminaire 301 may indicate, via respective visual sequences, that the luminaire 301 is unable to detect the presence of the wireless network 302; that the luminaire 301 is able to detect the presence of the wireless network 302 but is unable to communicate with the host 318 or 332, with another wireless network node such as another luminaire 305, 308, and/or with the wireless gateway 310; that the luminaire 301 is detecting wireless interference that is above a pre-defined threshold; that the luminaire 301 has been dropped or excluded from the wireless network 302; etc.

Accordingly, embodiments of the novel and inventive hazardous environment lighting unit, light fixture, or luminaire disclosed herein provide significant advantages over known techniques for communicating detected events and/or alerts to personnel, people, and users who are located in the hazardous environment in which the HE lighting unit, light fixture, or luminaire is disposed. For example, personnel who are located within the hazardous environment do not need to carry a portable computing device in order to be informed of various alert and/or detected events and/or conditions, let alone need to position the portable computing device to be in line-of-sight of the luminaire or physically connect the portable computing device to the luminaire, as the personnel may be informed merely by perceiving the visual sequences generated by the luminaire. Advantageously, forgoing the need to carry a portable computing device within the hazardous environment lowers the overall risk of ignition, explosion, and/or other undesirable events occurring within the hazardous environment.

Further, personnel who are located within the hazardous environment may be informed in real-time of alerts and/or detected events/conditions upon the events'/conditions' respective occurrences, without needing to wait for messages to be sent first to the back-end server and then being subsequently notified by the back-end server and/or by back-end personnel. This benefit is particularly advantageous when critical alarms or events occur—anyone in the vicinity of the HE lighting unit, light fixture, or luminaire (such as personnel from other areas of the plant, janitors, security guards, etc.) may be able to be easily informed of the critical alarm or event via the visual sequences generated by the luminaire and take mitigating action. Still further, alerts and indications of critical alarms/events are able to be communicated simultaneously and/or in a timely manner upon their occurrences to both personnel within the hazardous environment via visual sequences as well as to personnel located in protected areas via communication networks 302, 312.

Moreover, when one or more of the networks 312, 302 is down, degraded, or sub-optimally operational, personnel located within the hazardous environment 300 may nonetheless be informed of any faults, failures, errors, and/or sub-optimal performance of the network(s) that are detected by the luminaire 301. Moreover, personnel located within the hazardous environment 300 may also may be informed of any other types of alerts and/or conditions or events pertaining to faults, errors, and other conditions of components/operations of the luminaire 301 itself even though the network(s) 302, 312 are not operational or are sub-optimally operational. This benefit is particularly advantageous during the commissioning of equipment within the hazardous environment 300, as the luminaire 301 is able to communicate on-board and/or network issues that are detected by the luminaire 301 to personnel located within the hazardous environment 300, even when portions of the network(s) 302, 312 and/or other equipment of the hazardous environment have not yet finished being commissioned.

The following additional considerations apply to the foregoing discussion.

A portable computing device, such as the device 332, which may operate in conjunction with embodiments of the hazardous environment lighting unit, light lighting unit, light fixture, or luminaire disclosed herein can be any suitable device capable of wireless communications such as a smartphone, a tablet computer, a laptop computer, a wearable or body-borne device, a drone, a camera, a media-streaming dongle or another personal media device, a wireless hotspot, a femtocell, or a broadband router. Further, the portable computing device and/or embodiments of the disclosed hazardous environment lighting unit, light fixture, or luminaire can operate as an internet-of-things (IoT) device or an Industrial internet-of-things (IIoT) device.

Certain embodiments are described in this disclosure as including logic or a number of components or modules. Modules may can be software modules (e.g., code stored on non-transitory machine-readable medium) or hardware modules. A hardware module is a tangible, non-transitory unit capable of performing certain operations and may be configured or arranged in a certain manner. A hardware module can include dedicated circuitry or logic that is permanently configured (e.g., as a special-purpose processor, such as a field programmable gate array (FPGA) or an application-specific integrated circuit (ASIC)) to perform certain operations. A hardware module may also include programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques can be provided as part of the operating system, a library used by multiple applications, a particular software application, etc. The software can be executed by one or more general-purpose processors or one or more special-purpose processors.

Upon reading this disclosure, those of skill in the art will appreciate still additional alternative structural and functional designs for a hazardous environment lighting unit, light fixture, or luminaire that communicates alerts and/or detected conditions and/or events via visual sequences through the principles disclosed in this disclosure. Thus, while this document illustrates and describes particular embodiments and applications, the disclosed embodiments are not limited to the precise construction and components disclosed. Various modifications, changes and variations, which will be apparent to those of ordinary skill in the art, may be made in the disclosed arrangement, operation and details of the method, and apparatus without departing from the spirit and scope defined in the appended claims.

What is claimed is:

1. A luminaire disposed in a hazardous environment, the luminaire being a first node of a wireless network, and the luminaire comprising:
   one or more drivers coupled to one or more illumination sources;
   one or more processors coupled to the one or more drivers;
   one or more memories storing a set of computer-executable instructions that, when executed by the one or more processors, cause the luminaire to:
   cause the one or more drivers to energize the one or more illumination sources responsive to signals that are received at the luminaire from a second node via the wireless network;
   detect a loss of the signals received from the second node while a communicative connection between the luminaire and the wireless network is maintained;

determine a particular blink sequence identifying the loss of the signals from the second node, the particular blink sequence included in a plurality of blink sequences; and cause the one or more drivers to further energize the one or more illumination sources in accordance with the particular blink sequence, thereby causing the luminaire to generate a visual sequence indicative of the detected loss of the signals from the second node; and a hazardous location enclosure in which the one or more illumination sources, the one or more drivers, the one or more processors, and the one or more memories are disposed.

2. The luminaire of claim 1, wherein the second node of the wireless network is another luminaire.

3. The luminaire of claim 1, wherein the second node is communicatively disposed within the wireless network between a host device and the luminaire, and the signals received at the luminaire from the second node include commands generated by the host device.

4. The luminaire of claim 1, wherein:
the luminaire and a computing device are coupled via a communication link;
the set of computer-executable instructions is further executable to cause the luminaire to transmit, to the computing device via the communication link, an electronic signal indicative of the loss of the signals received from the second node; and
the electronic signal further indicates the second node.

5. The luminaire of claim 1, wherein:
the loss of signals received from the second node is a first particular event of a plurality of events and the particular blink sequence is a first particular blink sequence; and
the set of computer-executable instructions, when executed by the one or more processors, cause the luminaire further to:
detect an occurrence, within the hazardous environment, of a second particular event of the plurality of events; and
cause the one or more drivers to energize the one or more illumination sources in accordance with a second particular blink sequence indicative of the second particular event.

6. The luminaire of claim 5, wherein the second particular event is a loss of communications of the luminaire via the wireless network.

7. The luminaire of claim 6, wherein the loss of the communications of the luminaire via the wireless network includes at least one of: a loss of a detection of the wireless network by the luminaire, or an exclusion of the luminaire from the wireless network.

8. The luminaire of claim 5, wherein the detection of the occurrence of the second particular event is a detection, by the luminaire, of wireless interference that is above a threshold.

9. The luminaire of claim 5, wherein:
the luminaire is a first luminaire that is communicatively disposed within the wireless network between a host device and a second luminaire, and the first luminaire is configured to relay commands generated by the host device to the second luminaire; and
the second particular event is a loss of communications with the second luminaire.

10. The luminaire of claim 1, wherein the one or more drivers energize the one or more illumination sources in accordance with the particular blink sequence during a commissioning of the luminaire and prior to a completion of the commissioning of the luminaire.

11. A luminaire disposed in a hazardous environment, the luminaire being a first node of a wireless network, and the luminaire comprising:
a blink sequence library stored in one or more memories and defining a plurality of blink sequences, each blink sequence identifying a respective event of a plurality of events;
an alerting unit comprising a set of computer-executable instructions that are stored on the one or more memories and that, when executed by one or more processors, cause the luminaire to:
detect a loss of signals received from a second node of the wireless network while a communicative connection between the luminaire and the wireless network is maintained;
access the blink sequence library to determine a particular blink sequence indicative of the loss of signals received from the second node; and
instruct one or more drivers to energize one or more illumination sources included in the luminaire in accordance with the particular blink sequence, thereby causing the luminaire to generate a visual sequence indicative of the detected loss of signals received from the second node; and
a hazardous location enclosure surrounding the one or more memories, the one or more processors, the one or more drivers, and the one or more illumination sources.

12. The luminaire of claim 11, wherein the luminaire is a first luminaire and the second node of the wireless network is a second luminaire.

13. The luminaire of claim 12, wherein the second luminaire is communicatively disposed within the wireless network between a host device and the first luminaire, and the second luminaire is configured to relay commands generated by the host device to the first luminaire.

14. The luminaire of claim 12, wherein the first luminaire is communicatively disposed within the wireless network between a host device and the second luminaire, and the first luminaire is configured to relay commands generated by the host device to the second luminaire.

15. The luminaire of claim 11, wherein the alerting unit is coupled to a computing device via a wireless communication link, and the alerting unit further transmits, to the computing device via the wireless communication link, a signal indicative of the loss of signals received from the second node.

16. The luminaire of claim 11, wherein:
the loss of the signals received from the second node is a first particular event and the particular blink sequence is a first particular blink sequence; and
the set of computer-executable instructions, when executed by the one or more processors, cause the luminaire further to:
detect an occurrence, within the hazardous environment, of a second particular event of the plurality of events; and
cause the one or more drivers to energize the one or more illumination sources in accordance with a second particular blink sequence indicative of the second particular event.

17. The luminaire of claim 16, wherein the second particular event is:
a loss of a detection of the wireless network by the luminaire;

an exclusion of the luminaire from the wireless network;
a detection, by the luminaire, of wireless interference above a threshold; or
a loss of communications of the luminaire with a third node of the wireless network while the communicative connection between the luminaire and the wireless network is maintained.

18. The luminaire of claim 17, wherein:
the third node is communicatively disposed within the wireless network between a host device and the luminaire, the third node is configured to relay control signals generated by the host device to the luminaire, and alerting unit instructs the one or more drivers energize the one or more illumination sources included in the luminaire in accordance with the control signals; or
the luminaire is communicatively disposed within the wireless network between the host device and the third node, the third node is another luminaire, and the luminaire is configured to relay the control signals generated by the host device to the another luminaire.

19. The luminaire of claim 11, wherein the particular blink sequence is distinguished from other blink sequences defined in the blink sequence library based on at least one of a frequency, a duty cycle, an amplitude, or a pattern of energizations of the one or more illumination sources by the one or more drivers.

20. The luminaire of claim 11, wherein the alerting unit instructs the one or more drivers to energize the one or more illumination sources in accordance with the particular blink sequence during a commissioning of the luminaire and prior to a completion of the commissioning of the luminaire.

\* \* \* \* \*